US012700043B2

(12) United States Patent
Lovings et al.

(10) Patent No.: US 12,700,043 B2
(45) Date of Patent: Aug. 4, 2026

(54) SYSTEMS AND METHODS FOR DETERMINING AN EVENT AND RESULTING DAMAGE USING CROWDSOURCED DATA

(71) Applicant: State Farm Mutual Automobile Insurance Company, Bloomington, IL (US)

(72) Inventors: Rick Lovings, Normal, IL (US); Jody A. Thoele, Bloomington, IL (US); Erik Skyten, Harriman, TN (US); Joann C. Yant, Bloomington, IL (US); Joshua Sutter, Bloomington, IL (US); Miguel A Garcia-Peguero, Goodyear, AZ (US); Shawn R. Harbaugh, Normal, IL (US); Tishauna Wilson, Tampa, FL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 2 days.

(21) Appl. No.: 18/597,587

(22) Filed: Mar. 6, 2024

(65) Prior Publication Data

US 2024/0303748 A1     Sep. 12, 2024

Related U.S. Application Data

(60) Provisional application No. 63/488,685, filed on Mar. 6, 2023.

(51) Int. Cl.
*G06Q 40/08*     (2012.01)

(52) U.S. Cl.
CPC .................................... *G06Q 40/08* (2013.01)

(58) Field of Classification Search
CPC .................................................... G06Q 40/08
See application file for complete search history.

(56) References Cited

U.S. PATENT DOCUMENTS

| | | | |
|---|---|---|---|
| 8,775,219 | B2 | 7/2014 | Swanson et al. |
| 10,387,960 | B2 | 8/2019 | Tofte et al. |
| 10,692,151 | B1 | 6/2020 | Kiper et al. |
| 11,966,981 | B2 | 4/2024 | Liu et al. |
| 2022/0301071 | A1 | 9/2022 | Kelsh et al. |
| 2024/0161199 | A1 | 5/2024 | Engelhorn et al. |
| 2024/0233030 | A1* | 7/2024 | Menon ................... G06Q 10/20 |

* cited by examiner

*Primary Examiner* — Edward Chang
(74) *Attorney, Agent, or Firm* — Armstrong Teasdale LLP

(57)     ABSTRACT

Systems and methods for determining an event and resulting damage using crowdsourced data are disclosed. A computer-implemented method in accordance with the present disclosure may comprise (i) receiving hazard event data; (ii) retrieving supplemental hazard event data (e.g., crowdsourced, donated, and/or public text data, image data, video data, and/or audio data) associated with the hazard event; (iii) applying the supplemental hazard event data to the trained event assessment model to generate model outputs; (iv) determining a recommendation based upon model outputs; and (v) transmitting a message.

21 Claims, 6 Drawing Sheets

600

Computing Device    610

Database System    620

Data Storage Devices 630

Communication Component 640

Generating Component    650

Determining Component    660

Processing Component    670

SYSTEMS AND METHODS FOR DETERMINING AN EVENT AND RESULTING DAMAGE USING CROWDSOURCED DATA

CROSS-REFERENCE TO RELATED APPLICATIONS

This application claims the benefit of priority to U.S. Provisional Patent Application No. 63/488,685 filed on Mar. 6, 2023, entitled "SYSTEMS AND METHODS FOR DETERMINING AN EVENT AND RESULTING DAMAGE USING CROWDSOURCED DATA," the entire contents and disclosures of which are hereby incorporated by reference herein in their entirety.

FIELD OF THE DISCLOSURE

The present disclosure generally relates to determining an occurrence of an event and resulting damage and, more particularly, to computer network-based systems and methods for determining an occurrence of an event including a particular location (e.g., impacted geographic area) of the event and resulting damage to a property using crowdsourced data.

BACKGROUND

Many companies and organizations may track natural hazard events, such as avalanches, floods, earthquakes and/or other seismic events, hailstorms, hurricanes, ice storms, lightning, strong winds, tornados, tsunamis, volcanic activity, wildfires, weather events, etc., which may have an impact on their business or public safety. Many companies may rely on weather predictions and measurements, such as the National Oceanic and Atmospheric Administration (NOAA) measurements taken with a certain radius. For example, insurance companies may rely on NOAA measurements taken for the general vicinity of an insured home, business, or vehicle at the city or county level. However, there may often be a difference between these measurements and the actual weather event for a specific location. Currently, there is no process for verifying these measurements against actual measurements at a specific location.

Accordingly, there exists a need to quickly, accurately, and simply validate natural hazard events and/or other hazard events, such as sink holes and mine subsidence, to improve responses by companies and organizations. Conventional techniques may have other inefficiencies, ineffectiveness, encumbrances, and/or drawbacks as well.

BRIEF SUMMARY

The present embodiments may relate to an event assessment (EA) system for validating and predicting a hazard event and/or other incident related information. In certain exemplary embodiments, a computer system and computer-implemented method may include and/or may be associated with parametric insurance, such as parametric homeowners insurance, parametric vehicle insurance, or the like.

In one aspect, an EA computing system may be provided. The EA computing system may include one or more local or remote processors, servers, sensors, transceivers, mobile devices, smart home controllers, smart vehicles, smart watches, smart contact lenses, augmented reality glasses, virtual reality headsets, mixed or extended reality headset or glasses, wearables, voice or chat bots, ChatGPT bots or computing devices, UAVs (unmanned aerial device) or drones, other input devices, and/or other electronic or electrical devices, which may be in wired or wireless communication with one another. For example, in one instance, an EA computing device may include at least one memory and at least one processor in communication with the at least one memory. The at least one processor may be programmed to: (1) receive incident data associated with a hazard event in a geographic radius and then retrieve supplemental hazard event data for a specific location within the geographic radius from one or more supplemental hazard event sources, wherein the supplemental hazard event data is associated with the hazard event. The at least one processor may be further programmed to (2) apply the supplemental hazard event data to a trained event assessment model to determine at least one of a status of the hazard event, and/or a status of a property, wherein the trained event assessment model is trained using historic event data, (3) receive an output from the trained event assessment model, wherein the output comprises a recommendation, and/or (4) transmit a message to a user computing device, the message including the recommendation. The computing device may include additional, less, or alternate functionality, including that discussed elsewhere herein.

In another aspect, a computer-based event assessment (EA) method may be provided that includes the following: (1) receiving incident data associated with a hazard event in a geographic radius, (2) retrieving supplemental hazard event data for a specific location within the geographic radius from one or more supplemental hazard event sources, wherein the supplemental hazard event data is associated with the hazard event, and (3) applying the supplemental hazard event data to a trained event assessment model to determine at least one of a status of the hazard event or a status of a property, wherein the trained event assessment model is trained using historic event data. The method may further include (4) receiving an output from the trained event assessment model wherein the output comprises a recommendation, and (5) transmitting a message to a user computing device, the message including the recommendation. The computer-based method may include additional, less, or alternate functionality, including that discussed elsewhere herein.

In another aspect, at least one non-transitory computer-readable storage media having computer-executable instructions embodied thereon may be provided. When executed by at least one processor, the computer-executable instructions may cause the at least one processor to receive incident data associated with a hazard event in a geographic radius and then retrieve supplemental hazard event data for a specific location within the geographic radius from one or more supplemental natural hazard event sources, wherein the supplemental hazard event data is associated with the hazard event. The instructions may further cause the at least one processor to apply the supplemental hazard event data to a trained event assessment model to determine at least one of a status of the hazard event or a status of a property, wherein the trained event assessment model is trained using historic event data, and receive an output from the trained event assessment model wherein the output comprises a recommendation. The instructions may further cause the at least one processor to transmit a message to a user computing device, the message including the recommendation. The at least one non-transitory computer-readable storage media may include additional, less, or alternate functionality, including that discussed elsewhere herein.

In yet another aspect, an EA computing system may be provided. The EA computing system may include one or more local or remote processors, servers, sensors, transceivers, mobile devices, smart home controllers, smart vehicles, smart watches, smart contact lenses, augmented reality glasses, virtual reality headsets, mixed or extended reality headset or glasses, wearables, voice or chat bots, ChatGPT bots or computing devices, UAVs (unmanned aerial device) or drones, other input devices, and/or other electronic or electrical devices, which may be in wired or wireless communication with one another. For example, in one instance, an EA computing device may include at least one memory and at least one processor in communication with the at least one memory. The at least one processor may be programmed to receive first incident data from a first data source, wherein the first incident data is a first data type, and retrieve second incident data from a second data source, wherein the second incident data is a second data type different from the first data type. The at least one processor may be further configured to translate the first incident data and the second incident data into a common format and save the translated first incident data and second incident data in the at least one memory. The computing device may include additional, less, or alternate functionality, including that discussed elsewhere herein.

In yet another aspect, an EA computing system may be provided. The EA computing system may include one or more local or remote processors, servers, sensors, transceivers, mobile devices, smart home controllers, smart vehicles, smart watches, smart contact lenses, augmented reality glasses, virtual reality headsets, mixed or extended reality headset or glasses, wearables, voice or chat bots, ChatGPT bots or computing devices, UAVs (unmanned aerial device) or drones, other input devices, and/or other electronic or electrical devices, which may be in wired or wireless communication with one another. For example, in one instance, an EA computing device may include at least one memory and at least one processor in communication with the at least one memory. The at least one processor may be programmed to retrieve one or more trigger parameters for an insurance contract, receive incident data associated with a hazard event in a geographic radius, and retrieve supplemental hazard event data for a specific location within the geographic radius from one or more supplemental hazard event sources, wherein the supplemental hazard event data is associated with the weather event. The at least one processor may be further configured to apply the supplemental hazard event data to a trained event assessment model to determine if the one or more trigger parameters are met, and, in response to the one or more trigger parameters being met, causing to be displayed on a user computing device, a claim associated with the insurance contract. The computing device may include additional, less, or alternate functionality, including that discussed elsewhere herein.

In yet another aspect, an EA computing system may be provided. The EA computing system may include one or more local or remote processors, servers, sensors, transceivers, mobile devices, smart home controllers, smart vehicles, smart watches, smart contact lenses, augmented reality glasses, virtual reality headsets, mixed or extended reality headset or glasses, wearables, voice or chat bots, ChatGPT bots or computing devices, UAVs (unmanned aerial device) or drones, other input devices, and/or other electronic or electrical devices, which may be in wired or wireless communication with one another. For example, in one instance, an EA computing device may include at least one memory and at least one processor in communication with the at least one memory. The at least one processor may be programmed to receive incident data associated with a hazard event in a geographic radius, retrieve first supplemental hazard event data for a location within the geographic radius from one or more supplemental hazard event sources, wherein the supplemental hazard event data is associated with the hazard event, and retrieve second supplemental hazard event data for the first location or a second location based upon the first supplemental hazard event data. The computing device may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
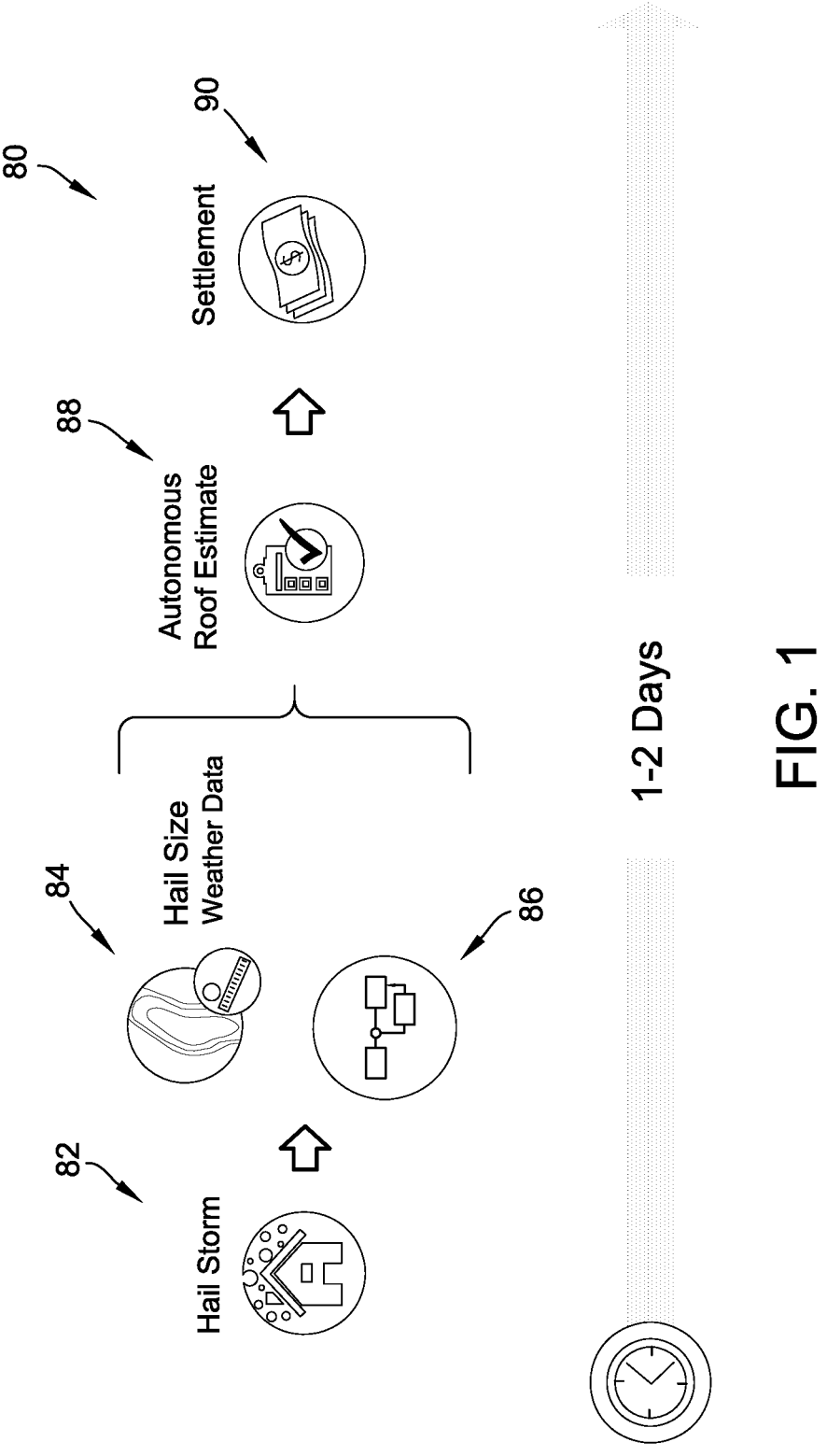
FIG. 1 illustrates a schematic of an exemplary process for determining property damage based upon supplemental data according to embodiments of the systems and methods described herein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for detecting, validating, and predicting a hazard event (e.g., avalanche, flood, earthquake and/or other seismic event, hailstorm, hurricane, ice storm, lightning, strong winds, tornado, tsunami, volcanic activity, wildfire, weather event, sink hole, mine subsidence, etc.) using event related information gathered from crowdsourced data feeds, donated data, public data, picture data, commentary data, social media data, and other data feeds. Certain embodiments described herein may relate to or be associated with parametric insurance, which may include issuing insurance payouts based upon triggering events detected and/or validated by the disclosed event assessment (EA) system.

As used herein, the term parametric insurance may describe a type of insurance contract that insures a policyholder against an occurrence of a specific event by paying a set amount based upon the magnitude of the event, as opposed to the magnitude of the losses which is what may be done in a more traditional indemnity policy. For example, a policyholder may enter into a parametric insurance policy that pays out $10,000 in the event that the residence of the policyholder experiences a hailstorm where the hail stones are 2 inches in diameter or greater. Thus, when the residence experiences a hailstorm, the question becomes whether the diameter of the hail stones are 2 inches or greater at the residence, and if so, a payout under the insurance policy will happen.

Certain companies and organizations track hazard events, such as weather events, which may have an impact on their business or public safety. Many of these companies and organizations rely on weather predictions and measurements, such as the National Oceanic and Atmospheric Administration (NOAA) measurements which may take certain weather measurements within a certain radius of a storm. For example, insurance companies may rely on NOAA measurements taken for the general vicinity of an insured home, business, or vehicle at the city or county level. However, there is often a difference between these measurements and the actual weather event for a specific location. Currently, there is no process for validating this data for a specific location, such a location of an insured home, business or vehicle.

Systems and methods described herein address at least the aforementioned issues, e.g., lack of validation of a hazard event for a particular location. More particularly, the systems and methods disclosed herein use crowdsourced, donated, and public data, pictures, commentary, and feeds to detect, confirm, and/or predict hazard event data, triggering events, and/or to identify damage.

An event assessment (EA) computing system is described herein that is configured to detect, validate, or predict hazard events and/or gather event information, in-real time and/or near real time, thereby expediting company and organization response times, reducing costs associated with locating areas affected by a hazard event, such as a weather event, and with assessing the severity of damage caused by the hazard event, and increasing the accuracy of data associated with a hazard event.

The EA computing system may automatically detect, validate, and/or predict a hazard event or other incident using crowdsourced, donated, and/or public text data, image data, video data, and/or audio data as will be described in more detail below.

Certain data may be obtained and/or gathered from different memory devices by the EA computing device described herein. For example, weather data may be obtained from the AccuWeather (AW) weather service international and/or the National Weather Service (NWS). In other embodiments, the hazard event source may be any suitable source including various websites associated with providing hazard event data. The hazard event source may provide incident data associated with a specific and/or isolated incident. For example, if the hazard event is a hailstorm, the incident data may include, but is not limited to, hail size, hail location, hail date, wind speed, wind direction, temperature, and/or any other data related to the hailstorm. Hazard incident data may be retrieved and/or received in real-time as the hazard incident is unfolding and/or immediately, e.g., less than 2 hours, less than 1 hour, less than 10 minutes, after the hazard event has transpired. Additionally, or alternatively, hazard incident data may be retrieved and/or received periodically and/or continuously, e.g., every 5 minutes, every 10 minutes, and/or every hour from the hazard event source.

Additionally, or alternatively, the EA computing device may collect climate data. The climate data may be received from one or more climate sources (e.g., via one or more APIs). The climate source may include, for example and without limitation, U.S. government funded data compiled by the Pacific Northeast National Laboratory and the Oakridge Laboratory for the U.S. Department of Energy's Building America Program. In some embodiments, the climate source may include the International Energy Conservation Code (IECC), International Residential Building (IRC) code, and/or the American Society of Heating, Refrigerating and Air-Conditioning Engineers (ASHRAE). In other embodiments, the EA computing device may receive climate data, directly or indirectly, from additional and/or alternative climate sources. The EA computing device may subsequently store the climate data within a climate database. In some embodiments, the EA computing device compiles the climate data retrieved from the climate source and/or stored in the climate database.

U.S. climate regions are recognized by the Building America (BA) program and climate zones are recognized by the International Energy Conservation Code (IECC). The BA climate regions may be similar to the IECC climate zones. In the embodiments described herein, climate locality may refer to a climate region designated by the BA program and/or a climate zone designated by the IECC. The EA computing device may use alternative or additional climate locality designations.

The BA climate regions are based upon heating degree days, average temperature, and precipitation. The BA climate regions includes the following eight regions: BA Region 1: Hot-Humid; BA Region 2: Mixed-Humid; BA Region 3: Hot-Dry; BA Region 4: Mixed-Dry; BA Region 5: Cold; BA Region 6: Very-Cold, BA Region 7: Subarctic, and BA Region 8: Marine.

The IECC designates climate zones: Zone 1, Zone 2, Zone 3, Zone 4, Zone 5, Zone 6, Zone 7, and Zone 8. In addition, the IECC identifies three moisture regimes identified by the IECC including A: Moist, B: Dry, and C: Marine. Accordingly, the IECC designates a total of 11 total climate localities. The 11 climate localities include: Zone 0A Extremely Hot Humid, Zone 0B Extremely Hot Dry, Zone 1A Very Hot Humid, Zone 1B Very Hot Dry, Zone 2A Hot Humid, Zone 2B Hot Dry, Zone 3A Warm Humid, Zone 3B Warm Dry, Zone 3C Warm Marine, Zone 4A Mixed Humid, Zone 4B Mixed Dry, Zone 4C Mixed Marine, Zone 5A Cool Humid, Zone 5B Cool Dry, Zone 5C Cool Marine, Zone 6A Cold Humid, Zone 6B Cold Dry, Zone 7 Very Cold, Zone 8 Subarctic/Arctic.

In some embodiments, the EA computing system may crowdsource hazard event data from publicly available or donated text data, image data, video data, and/or audio data.

The text data, image data, video data, and/or audio data may be extracted from social media posts, including but not limited to photographs, videos, livestreams, reels, descriptions, and/or comments. For example, users may submit photographs, videos, and/or commentary to a public social media page (e.g., a news and/or weather website). Additionally, or alternatively, social media users may opt-in to data sharing. Additionally, or alternatively, the EA system may collect data from public social media accounts.

The EA system may search and/or filter the crowdsourced data based upon hashtags, words or phrases, locations, and time stamps. For example, if the EA system receives an indication that a hailstorm is occurring in a particular city, the EA system may filter social media posts based upon their geotag or other location information and time stamp. Social media posts within a certain radius of a target location and timeframe may be searched for certain phrases and/or hashtags. The target location may be a location of an insured home or business or an insured vehicle. So, if a public social media account posted a photograph within the radius of a target location and timeframe of the hailstorm with the caption "Wow, this hail is the size of a golf ball!", the EA system may use the accompanying photograph or video to validate that the hailstorm did in fact occur at the target location, and the hail was approximately one or two inches in diameter.

Additionally, or alternatively, the EA system may search and/or filter donated data, including but not limited to text data, image data, video data, and/or audio data. The donated data may be sourced from home or business security cameras, dash cameras, doorbell cameras, and/or weather chaser partnerships. For example, then a user subscribes to a camera service, the user may opt-in to data sharing. In some embodiments, when the EA system receives an alert that a hazard event (e.g., avalanche, flood, earthquake and/or other seismic event, hailstorm, hurricane, ice storm, lightning, strong winds, tornado, tsunami, volcanic activity, wildfire, weather event, sink hole, mine subsidence, etc.) is occurring at a city or county level, the EA system may filter cameras that have opted into data sharing by location and time to obtain photographs and/or video to validate a hazard event.

Additionally, or alternatively, the EA system may search and/or filter publicly available data, including but not limited to, image data, video data, and/or audio data from public security cameras, traffic cameras, and/or any other public camera and/or other Smart City data. If the EA system receives an alert that a hazard event is occurring at a city or county level, the EA system may filter by location and time to obtain photographs and/or video to validate that one or more hazard events have, in fact, occurred.

In some embodiments, the EA computing system may use Computer Vision to analyze photographs and/or still images obtained from a video to confirm a hazard event and/or damage to a vehicle or structure. In some embodiments, after a hazard event and/or damage is confirmed, an insurance claim may be automatically generated, as discussed in more detail below.

Currently, after a hazard event, such as an avalanche, flood, earthquake and/or other seismic event, hailstorm, hurricane, ice storm, lightning, strong winds, tornado, tsunami, volcanic activity, wildfire, weather event, sink hole, mine subsidence, etc., a policyholder may submit a claim. The claim may be a formal request, by the policyholder, for compensation of a covered loss or policy event, e.g., property damage resulting from a hazard event. Submission of a claim may initiate a series of claim processing events that culminate, potentially, in compensation of the insured policyholder. Conventional claim processing events include submission of a claim and scheduling of a date and time for a claim adjustor to perform an in-person inspection to assess the property damage caused by the hazard event. Thus, conventional claim processing events may be both costly and time consuming.

Conventionally, the policyholder may initiate claim processing events, such as by submitting a claim. Additionally, a delay in claim submission after a hazard event contributes to claim processing times and, in some cases, may delay the compensation of the insured policyholder. Policyholders may delay submitting a claim for a variety of reasons, perhaps, because the policyholder's attention is drawn towards more pertinent issues resulting from the hazard event.

In another example, the policyholder may delay submitting a claim because the policyholder is unaware of the property damage caused by the hazard event. For example, a policyholder may not realize a roof needs repair until the next time it rains and the damage caused by a previous weather incident results in leakage of the roof. In another example, a policyholder may not realize a roof needs repair because they are not at the house, e.g., the policyholder is on vacation and/or otherwise out of town.

In-person inspections may include one or more of the following activities: a visual inspection, a collection of images and/or video of the damaged property, and/or a live stream video of the damaged property. The inspections may be performed by a person, such as a trained insurance adjustor, an inspector, a contractor, and/or a building inspector. The inspection may include one or more person(s) determining the extent, e.g., severity, of the damage, determining the region of the damage, determining a cost to repair and/or replace the damaged property, and/or determining a time required to repair and/or replace the damaged property. Accordingly, an in-person inspection to determine a property status may be both costly and time-consuming.

In the present system, the validated hazard event and/or other incident information may be used to automatically determine damage resulting from the hazard event (e.g., avalanche, flood, earthquake and/or other seismic event, hailstorm, hurricane, ice storm, lightning, strong winds, tornado, tsunami, volcanic activity, wildfire, weather event, sink hole, mine subsidence, etc.). The damage determination may then be used for insurance claim processing, as described in more detail below. This may eliminate the need for a policyholder to initiate a claim and/or an in-person inspection, as described in more detail below.

More particularly, in the systems and methods described herein, the EA computing system may detect and/or validate triggering events. A triggering event may include a hazard event that may be defined by a parametric insurance policy. For example, a triggering event may include a weather incident satisfying a weather severity threshold. The triggering event may be detected and/or validated through crowdsourced, donated, and/or public text data, image data, video data, and/or audio data, as described above. For example, if the EA system receives an alert that a weather or other event is occurring at a city or county level, the EA system may filter by location and time to obtain photographs and/or video to validate a weather or other event for a specific location. If the weather or other event is validated, it may be considered a triggering event. Additionally, or alternatively, the EA system may use relevant image and video data to determine a severity of the weather or other hazard event. If the weather or other hazard event meets the severity threshold, it may be considered a triggering event.

The EA computing system described herein may automatically and/or autonomously determine damage to a vehicle or structure based upon information about the vehicle or structure and the hazard event data, thereby removing the need for in-person inspection and/or other inspection of the vehicle or structure. The damage information may be used to identify whether to approve a potential claim (e.g., based upon a model output associated with a structure status), notify a policyholder of the potential claim, and/or automatically process the claim (e.g., including providing settlement funds to the policyholder and/or closing the claim) in real time upon receiving approval from the policyholder.

The systems and methods described herein may be used to determine a status of a vehicle or structure. For example, the EA system may determine the status of one or more structural components of a building, such as, but not limited to, a foundation status, a wall status, a window status, and/or other structural component status and/or a status of a structure other than a building such as a fence, pool, etc. A property status may be associated with property damage as a result of the weather or other event. The property status may include a cost to repair or replace the property damage after a hazard event. The property damage may require repair and/or replacement of at least a portion of the structure, e.g., one or more shingles of a roof. The EA system may also determine a severity level for each determined property status. The severity level may be associated with a cost to repair and/or replace the property damage.

In some embodiments, the severity level may be associated with an amount of time required to repair and/or replace the structure or a portion of the structure. For example, a high severity level may be associated with an increased cost and increased repair time as compared to a property status having a lower severity level. In some embodiments, the severity level may be between zero and one, wherein a severity level of one indicates that the structure or a portion of the structure will need to be replaced in its entirety, e.g., complete failure. In some cases, the property status may have a severity level of zero, indicating that the weather event or other incident did not cause damage. The severity level may be a percentage, e.g., a severity level of one is a 100% failure.

Estimated hazard event data may be received via an application programming interface (API) associated with a hazard event service (e.g., a weather service) and be presented as a heat map, which relates hazard event severity levels (e.g., weather severity levels) with location data. The heat map may be presented in graphical format, showing a color-coded severity level gradient overlaid with a geographic map showing locations of active policies. In some embodiments, the heat map may be formatted in a table relating severity level with geographic location. Upon receiving the estimated hazard event data, the EA system may search and/or filter crowdsourced, donated, and/or public text data, image data, video data, and/or audio data to validate and/or determine the severity of the hazard event at a specific location.

In some embodiments, the EA system may determine the property status prior to the submission of a claim by the policyholder. However, a determined property status and/or a determined cost may not be utilized until the policyholder formally submits a claim. For example, the determined status and cost may not be transmitted for further processing, transmitted to the policyholder, and/or funds may not be issued, until the policyholder submits a claim. Determining the property status and/or determining a cost (e.g., in real time with respect to receiving hazard event data) prior to the policyholder submitting a claim may reduce delays as the property status and/or cost are prepared in advance and are ready for when the policyholder eventually submits a claim. In some embodiments, the EA computing device may transmit one or more messages, e.g., to a computing device associated with the policyholder, prompting a policyholder to submit a claim (e.g., by selection of one or more selectors that are caused to be displayed on a user computing device).

The EA system may include an EA computing device. The EA computing device may include at least one processor and at least one memory communicatively coupled to the at least one processor. In some embodiments, the EA computing device may be associated with an insurance provider that provides insurance policies for vehicles and/or properties, such as roofs and/or buildings. In other embodiments, the EA computing device may be associated with other parties.

The EA computing device may determine a vehicle or property status by applying subject vehicle or property data, hazard event data, and/or climate data to a trained event assessment model. The EA computing device may be configured to store the event assessment model. In some embodiments, the event assessment model may be stored in the memory of the EA computing device. In other embodiments, the event assessment model is stored in a historic database for subsequent retrieval.

In some embodiments, the EA computing device trains the event assessment model using historical event data, such as crowdsourced, donated, and/or public text data, image data, video data, and/or audio data, from before and after a hazard event. The EA computing device may be communicatively coupled to a historic event database storing a plurality of historic event records. In other embodiments, the EA computing device may be integrally formed with the historic database. The historic event records may each be associated with a historic property (e.g., a structure or vehicle), includes climate locality data, vehicle or structural data, and/or data associated with an historic vehicle or structure status resulting from a historic hazard event. The historic record may also include historic hazard event data. For example, if the hazard event is a hailstorm, the hazard event data may include hail size, duration, etc.

The historic vehicle or property status may be a result of the historic hazard event. For example, the historic vehicle or property status may have been determined shortly, e.g., days or weeks, after the historic hazard event. Historic data, including the historic property status, may have been determined using any method, e.g., visual inspection, and/or evaluation of images and/or video of the historic property.

In some embodiments, the EA computing device and/or the historic database may receive historic vehicle or structure records from insurance providers and/or other parties. In some embodiments, the EA computing device may receive data from various sources and create the historic event records which are stored in the historic database.

Historic vehicle and structure records may include general data associated with a plurality of similar vehicles or structures. Similar vehicles include vehicles of the same type, the same make, the same model, used within the same climate locality as the historic vehicle record, and/or similar hazard event data. Similar structures include structures having similar structural data, the same climate locality as the structure of the historic structure record, and/or similar hazard event data. For example, the general structure data may include policy exposure, claim counts, and/or claim frequency for the plurality of similar structures.

In some embodiments, the EA system may include an application program interfaces (API) e.g., and/or a plurality of APIs. The API may be executed by the EA computing device, and/or one or more computing devices associated with the user and/or the insurance entity. The API may facilitate communications, e.g., encrypted communications, between the various entities of the EA system. In some embodiments, the API may display and/or present information and/or the API may provide a platform of acceptance and/or denial of one or more inputs, e.g., queries, requests, and/or confirmations.

In some embodiments, the hazard event sources (e.g., AccuWeather (AW) weather service international, the National weather service (NWS), etc.). may transmit one or more messages to computing devices using the API. For example, a hazard event may trigger the hazard event data source to transmit the one or more messages, e.g., an alert message, to the EA computing device and/or a computing device associated with a user and/or an insurance provider. In some embodiments, the EA computing device may receive hazard event data by executing an API to access the hazard event data from a hazard event data source.

The API may transmit hazard event data (e.g., hail size, location, and/or a weather heat map). The weather heat map may include a relationship between location data and a severity of the hazard event data, (e.g., hail size). In some embodiments, the weather heat map may be displayed as a color-coded scale of severity level (e.g., red-increased severity and blue-low severity) overlaid onto a locational map of a region in which the hazard event occurred. The heat map may include one or more regions on a location map that are circumscribed by a polygon and are color-coded with the same severity level.

After receiving an alert message, the EA system may validate the weather or other event data for a specific location. For example, if the EA system receives an alert that a hazard event (e.g., avalanche, flood, earthquake and/or other seismic event, hail storm, hurricane, ice storm, lightning, strong winds, tornado, tsunami, volcanic activity, wildfire, weather event, sink hole, mine subsidence, etc.) is occurring at a city or county level, the EA system may filter by location and time to obtain photographs and/or video to validate the hazard event for a specific location. The specific location may be associated with a vehicle, structure, or a person.

In some embodiments, the EA system may finetune and/or revise event data for one or more locations. For example, in some embodiments, the EA system may receive hazard event data for a geographic location. The EA system may retrieve supplemental hazard event data (e.g., text data, image data, video data, audio data, etc. from crowdsourced data feeds, donated data, public data, social media data, and other data feeds) for the geographic location. Additional data may then be pulled based upon the supplemental hazard event data for the location. For example, if no hail was detected at the time predicted by a weather service, but the supplemental hazard event data indicates that a hail-storm occurred 10 minutes later (e.g., a social media post with the caption "Wow, look at the size of this hail!" with a time stamp for 10 minutes after the predicted time), the EA system may pull additional supplemental hazard event data 10 minutes after the predicted time. The EA system may use this data to finetune and/or revise the hazard event data.

If the validated hazard event data qualifies as a triggering event, the EA system may perform one or more actions. For example, in some embodiments, the EA system may automatically determine damage to a vehicle or structure using Computer Vision and/or an event assessment model, as discussed above. Additionally, or alternatively, the EA system may automatically send an alert to an insurance policyholder and/or trigger a parametric insurance payment. Additionally, or alternatively, the EA system may automatically transmit an alert to an emergency services organization, public works department, and/or first responder.

In some embodiments, the EA computing device may generate, e.g., train, the event assessment model for determining a property status using a training dataset that includes one or more training variables, e.g., model parameters, such as vehicle or structure status, supplemental hazard event data (e.g., crowdsourced, donated, and/or public text data, image data, video data, and/or audio data), climate data, and/or vehicle or structural data. The training dataset may include the historic event records or a subset of the historic event records.

In other embodiments, the EA computing device may generate the event assessment model in a different format. For example, the event assessment model may be a function for receiving data for a subject vehicle or structure and generating an output for determining a status of the vehicle or structure.

The event assessment model may be associated with and/or include a parametric engine. The parametric engine represents a relationship between input data, e.g., training variables, and predicted outputs. The training variables may be parameterized allowing the parametric engine to be tuned to generate accurate outputs. Parameterized training variables may be weighted using weighting coefficients. The parametric engine may be tuned to determine a magnitude and/or a direction of the weighting coefficients. Tuning may include iteratively using the parametric model to generate model outputs that correspond to an actual event, e.g., a historic event, while adjusting the magnitude and direction of the weight coefficients until the error between the model output and the actual event is reduced to an acceptable level. Tuning may be performed in addition to, and/or in combination with, training the model using historic data.

The parametric engine may use the weighted coefficients to rank an importance or influence of a model training variable. For example, the greater the weighting factor the greater the importance the EA computing device will associate with that variable when tuning the model. Likewise, the smaller the weighting factor the lesser the importance that the EA computing device will associate with the variable when tuning the model. In some embodiments, the EA computing device may weight variables associated with the hazard event data greater than any other model training variables.

In some embodiments, the EA computing device may use a reduced number of training variables, e.g., one or more training variables, that have the greatest weighting factors, e.g., the variables that are ranked with the most importance. The reduced and more focused training dataset, including the training variables with the greatest weights, decreases computational load and will have decreased model training time allowing the model to be more quickly updated as more historic property records are created and added to the subset training dataset. The EA computing device may generate a training dataset including less than five model training variables and/or less than three model training variables, for example.

The EA computing device may also determine a confidence score for one or more of the model outputs. The confidence score may be associated with a percent likelihood a determined vehicle or structure status is a correct assessment of the vehicle or structure damage. For example, the confidence score may be between zero and one. A confidence score close to one, e.g., greater than one-half, indicates that the determined vehicle or structure status likely accurately reflects the actual vehicle or structure damage.

Preferably, a vehicle or structure status with a confidence score of one, indicates that the model determined vehicle or structure status is the same, or substantially the same, as an assessment of the vehicle or structure damage determined by an in-person inspection. For example, a cost associated with the vehicle or structure status, as predicted by the model would match, or substantially matches, a cost determined by an in-person inspection, and/or the actual cost to repair the damage.

In some embodiments, the EA computing device may be configured to provide information associated with the determined property status to an insurance provider associated with an insurance policy of the property to facilitate processing an insurance enrollment and/or determination of insurance premiums. In some embodiments, the EA computing device may be communicatively coupled to one or more insurance computing devices associated with one or more insurance providers. The insurance computing devices may be configured to receive, generate, and/or otherwise process insurance enrollment and purchasing. In other embodiments, the EA computing device may be an insurance computing device.

In some embodiments, the EA computing device may be configured to provide information associated with the determined vehicle or structure status to an emergency services organization, public works department, and/or first responder. For example, if the determined structure status of a house is severe after a weather event such as a tornado, the EA computing device may be configured to provide this information to first responders so that they may provide assistance to the residents.

The EA computing device may perform an event assessment process by receiving text data, image data, video data, and/or audio data associated with a subject vehicle or structure and applying the text data, image data, video data, and/or audio data to the trained, and/or tuned, event assessment model. The text data, image data, video data, and/or audio data may be obtained from crowdsourced, donated, and/or public data, as described above. The EA computing device may receive the different types of data (e.g., text data, image state, video data, audio data, etc.) and may be configured to translate, analyze, parse, and/or reformat the data into a standardized format. The data in the standardized format may be saved in a memory of the EA computing device so that it may be used for further analysis. For example, the EA computing device may receive image data and/or video data that may be analyzed using Computer Vision. The image data and/or video data may be translated, analyzed, parsed, and/or reformatted into text data.

In some embodiments, the EA computing device may be configured to prompt a user associated with the subject vehicle or structure to submit a claim. In such embodiments, the EA computing device may be communicatively coupled to a user computing device associated with the user. The EA computing device may transmit prompts and/or questions to the user computing device for display to the user. The user may answer the prompts and/or questions and transmit a response back to the EA computing device.

In some embodiments, the determined vehicle or structure status may be transmitted to an insurance computing device for performing one or more operations associated with providing a claim fund to compensate the policyholder. In some embodiments, the determined vehicle or structure status is stored until a policyholder submits a claim. In some embodiments, the EA computing device may transmit data, e.g., a claim funds quote and/or one or more vehicle or structure statuses to the user associated with the building. Contact information for the user may be retrieved from the subject property, contact information provided for an insurance policy of the property, and/or other data sources that store contact information. In some cases, funds may be routed directed to an account of the policyholder.

In some embodiments, the API may be used to transmit the determined vehicle or structure status. For example, the API may cause the user computing device to present the determined vehicle or structure status. In some embodiments, the API may cause the user computing device to prompt the user to perform one or more actions. For example, the API may prompt the user to initiate a claim. The validated hazard event data may trigger the API to transmit one or more messages to the EA computing device and/or the user computing device, causing the user computing device to display a prompt including an indication that a hazard event occurred at a particular location that may have affected a covered loss of a policyholder.

The prompt may request that the user confirm a claim submission for the covered loss (e.g., by selecting a selector that is caused to be displayed). For example, the prompt may request that the user selects at least one of a yes (e.g., proceed) selector or a no (e.g., decline) selector of the claim submission.

After the EA computing device has determined the property damage, and/or after the user has confirmed the initiation of a claim submission, the API may transmit one or more messages that prompt the user to accept settlement funds associated with the determined property damage. The API may cause the user computing device to present the funds amount to a user and a prompt requesting the user to select at least one of a yes (e.g., accept issuance of funds) selector or a no (e.g., decline the issuance of funds) selector. In some embodiments, if the user selects yes, the settlement funds may be issued such that the funds are directly deposited, e.g., electronic deposit, in a financial account of the policyholder.

In some embodiments, the API may submit prompts and/or information using text messaging and/or, the API may present information and/or prompts using a graphical user interface.

In other words, the EA system described herein may confirm weather or other event in a particular location and/or damage to a vehicle or structure. The EA system may further automate a claim handling process for certain events by automating damage detection, producing a claim estimate, making customer contact, and making payment (e.g., in real time). Thus, the claim handling process for damage may be reduced in duration.

From a customer (e.g., user, policyholder, etc.) perspective, satisfaction in the claim process is improved by implementation of the EA system. For example, customers may want a simple, fast, and flexible experience after a loss occurs. The EA system may automatically determine if a hazard event occurred and/or if damage of a vehicle or structure has occurred after a trigger event such as a hailstorm, thereby reducing the claim cycle time for the policyholder by eliminating the need to send an adjuster to assess damage and determine coverage.

From an insurance provider perspective, operating costs may be reduced by eliminating the need for in-person assessment and automation of a manual process freeing claim handler capacity for other work. Further, assessment accuracy may be increased and human error may be reduced. The amount of workplace injuries may also be reduced. Accordingly, insurance provider handling of claims with customers may be prompt and accurate.

The EA system may also automate estimate writing based upon the data described herein. For example, supplemental event data may be inputted into the model along with policy data (e.g., associated with an insurance policy). The model may then output an estimate based upon results with deprecation. A PDF or physical copy, with dollar amount for payment (e.g., total replacement cost value minus deductible minus depreciation) may be generated along with an automatic email (e.g., email address gathered from policy data) of an estimate to claim file (drop file folder or specified address) and send to the policyholder.

Settlement may also be automatically handled by the EA system (e.g., upon receipt of a claim). For example, the EA system may initiate an electronic funds transfer (EFT) to a checking account on file of the policyholder. In some embodiments, presentation of the validated hazard event and/or damage may be transmitted to a claim representative for a manual decision and/or presentation of the claim file may be autonomously handled by the EA system to a specific point before being automatically turned back over to claims.

While the EA system may pre-emptively identify vehicles or a portion of a structure that may need replacement upon the occurrence of a certain hazard event, in some embodiments an option of requiring "notice of claim" may be implemented (e.g., as selected by policyholders) wherein a claim must first be filed (e.g., through conventional means) before the event assessment model is applied to a property associated with those policyholders. Additionally/alternatively, in some embodiments, the EA system may proactively notify policyholders based upon validated weather events and/or outputs of the event assessment model.

In some embodiments, an Exchange Traded Fund (ETF) process using on-file checking numbers and routing numbers for policyholders may allow for automatic transfer funds into an account upon settlement and prior to claim process completion (e.g., while a policyholder is still on the phone with a representative).

In sum, the EA system may validate hazard event data and may be used to significantly reduce the time from a hazard event to action on behalf of a company or organization. For example, in the case of an insurance settlement, the EA system may eliminate the need for an in-person inspection, and may limit policyholder interaction with the insurance carrier. This may reduce operational expenses and improve employee safety. Vast historical data may be utilized, and specific and detailed rules may be generated and utilized to be able to drive automated vehicle or structure damage decisions based upon text data, image data, video data, and/or audio data in a very short amount of time, thereby eliminating/improving a process that currently takes weeks and months.

In one embodiment, the EA system may receive weather data from one or more weather sources, e.g., AccuWeather (AW). The weather data may be received by an Application Programming Interface (API). The weather data may include general location information. The EA system may search and/or filter crowdsourced, donated, and/or publicly available data, photographs, video, feeds, and commentary to validate the weather event.

For example, in some embodiments, if the EA system receives an alert that a hazard event (e.g., avalanche, flood, earthquake and/or other seismic event, hail storm, hurricane, ice storm, lightning, strong winds, tornado, tsunami, volcanic activity, wildfire, weather event, sink hole, mine subsidence, etc.) is occurring at a city or county level, the EA system may search, collect, and filter data on social media websites and applications. The data may include, but is not limited to hashtags, words or phrases, locations, and time stamps. For example, if the EA system receives an indication that a hailstorm is occurring in a particular city, the EA system may filter publicly available social media posts based upon their geotag or other location information and time stamp.

Social media posts within a certain radius and timeframe may be searched for certain phrases and/or hashtags. For example, if the EA system receives an alert that a hailstorm is occurring in a particular city, the EA system may search social media feeds for posts uploaded during the time period of the weather event and with a geotag or other location information within a radius of a target location. The target location may be associated with a location of an insured vehicle, home, or business.

Additionally, or alternatively, the EA system may search and/or filter donated data, including but not limited to, data, photographs, and video. The donated data may be sourced from home or business security cameras, dash cameras, doorbell cameras, and/or weather chaser partnerships. For example, then a user subscribes to a camera service, the user may opt-in to data sharing. In some embodiments, when the EA system receives an alert that a hazard event (e.g., avalanche, flood, earthquake and/or other seismic event, hail storm, hurricane, ice storm, lightning, strong winds, tornado, tsunami, volcanic activity, wildfire, weather event, sink hole, mine subsidence, etc.) is occurring at a city or county level, the EA system may filter cameras that have opted into data sharing by location and time to obtain photographs and/or video to validate a weather event and/or other incident.

Additionally, or alternatively, the EA system may search and/or filter publicly available data, including but not limited to, data, photographs, and video from public security cameras, traffic cameras, and/or any other public camera and/or other Smart City data. If the EA system receives an alert that a hazard event (e.g., avalanche, flood, earthquake and/or other seismic event, hail storm, hurricane, ice storm, lightning, strong winds, tornado, tsunami, volcanic activity, wildfire, weather event, sink hole, mine subsidence, etc.) is occurring at a city or county level, the EA system may filter by location and time to obtain photographs and/or video to validate a hazard event in a particular area.

The photographs, video, still images obtained from a video, text data and/or other data may then be run through parametric engine(s) (e.g., model(s)) that determine, based upon all the data parameters and rules, whether a hazard event occurred in a particular area, the severity of a hazard event, and/or damage to a vehicle or structure. In some embodiments, an automated insurance estimate may be created and an actual cash value settlement electronic fund may be transferred to the bank account on file of the policyholder. Additionally, or alternatively, the output of the model(s) may be transmitted to an emergency services organization, public works department, and/or first responder.

The example embodiment may take, at minimum, just the damage assessment from weeks/months in its current state, to a matter of hours/minutes/seconds depending on how quickly the triggering data is received and the severity of the hazard event (e.g., and therefore processing time). An insurance provider may then be able to notify a customer that there may be damage to the house via text or email, and upon the response of the customer ("y" to proceed or "n" to decline) would initiate the settlement, or allow in-office partners to write insurance estimates instantly without delay and send actual cash value (ACV) checks. In other words, no representatives, no waiting, no inspection scheduling and fewer contact points are required. Further, increased claim handling consistency, fewer workplace injuries, more inspections per day per representative, lowered operating costs, shorter deployments for adjusters, better work/life balance, and customer and employee satisfaction may be provided.

At least one of the technical problems addressed by this system may include: (i) the difference between a predicted hazard event and the actual the presence and/or severity of a hazard event at a specific location; (ii) time-consuming, labor-intensive, and costly determination of the status of a property resulting from a hazard event, including requiring one or more persons, e.g., policyholders and insurance agents etc., to perform one or more claim processing events e.g., submitting a claim and/or performing an in-person inspection to determine a property status; (iii) extended processing times for determining an insurance quote or issuance of a payment to the claim holder; (iv) incomplete damage assessment causing increased cost for both policyholders and insurance providers; (v) limited quantitative analysis of damage assessments relative to historic data and/or (vi) receiving data from a limited number of data sources.

The technical effect achieved by this system may be at least one of: (i) increased accuracy when determining the presence and severity of a hazard event; (ii) increased accuracy when assessing damage of a vehicle or structure; (iii) reduced processing time and costs associated with generating insurance quotes and/or claim processing events; (iv) more accurate damage assessment analysis; (v) increased quantitative analysis of damage assessments relative to historical data; and/or (vi) receiving data from a plurality of different data sources and translating the data into a common format for further analysis.

A technical effect of the systems and processes described herein may be achieved by performing at least one of the following steps: (i) receiving hazard event data; (ii) retrieving supplemental hazard event data (e.g., crowdsourced, donated, and/or public text data, image data, video data, and/or audio data) associated with the hazard event; (iii) applying the supplemental hazard event data to the trained event assessment model to generate model outputs; (iv) determining a recommendation based upon model outputs; and (v) transmitting a message.

Conventional Damage Assessment Process

In a conventional damage assessment process, after a hazard event, measurements may be made (e.g., manually) and a policyholder may submit a claim formally requesting compensation of a covered loss or policy event, such as property damage resulting from a hazard event. Submission of claim initiates a series of processing events that culminate, potentially, in issuance of funds, to an insured policyholder. The policyholder may submit a claim by, for example, calling an insurance representative or submitting a claim via an insurance website. After the claim submission, method includes manually assigning (e.g., by an insurance representative) field representatives to inspect the alleged property damage and manually scheduling a date and time for field representatives to perform an in-person inspection of the property in order to assess property damage caused as a result of a hazard event. Next, method includes the field representatives traveling to the property to perform an inspection.

Based upon inspection, a handwritten estimate is provided to the policyholder and, eventually (e.g., based upon further manual analysis by insurance representatives) a settlement may be provided.

Notably, the time and financial costs associated with method are significant. For example, significant time costs include scheduling an inspection, traveling to the property, and/or performing inspection, may be substantial considering wage compensation of the field representatives, and travel costs. In addition, method may take time to schedule an inspection, travel to the property, perform inspection, process inspection and assess the damage, determine a cost associated with the damage, and compensate the insured policyholder (e.g., greater than two weeks, and/or greater than a month, depending on the complexity of the assessment, the location of the property, and/or waiting time based upon queue position of the policyholder).

Exemplary Event Assessment (EA) System

Figure 2:
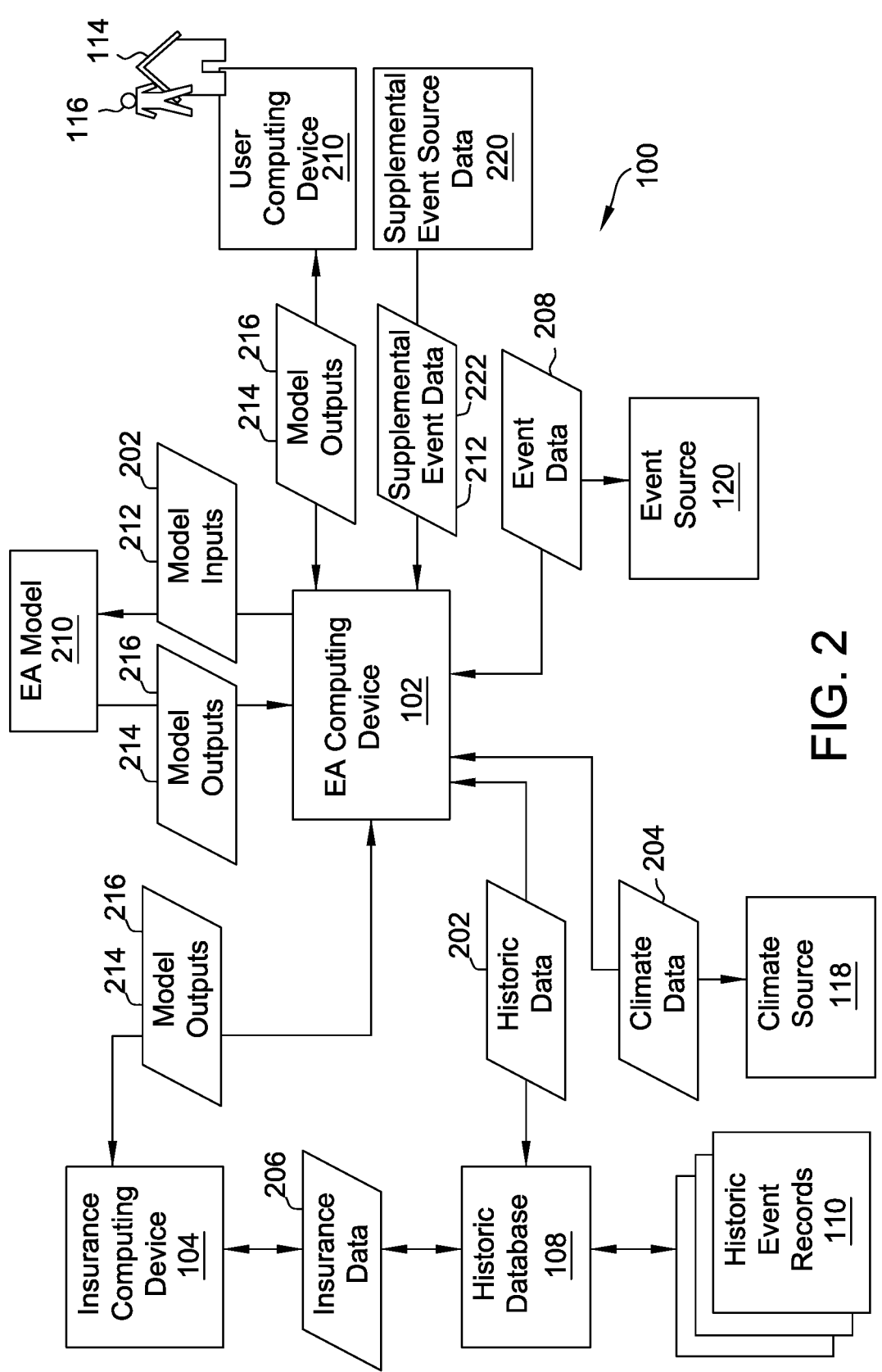
FIG. 2 illustrates a data flow diagram of an exemplary event assessment (EA) process that may be implemented by the EA system described herein.

FIG. 1 depicts an expedited computer-implemented method 80 of processing a claim implemented by exemplary EA system 100, as described herein (see e.g., FIG. 2). Method 80 may include, during and/or after a hazard event, such as a hailstorm 82, automatically receiving hazard event data (e.g., weather data), such as hail size 84 (e.g., via one or more APIs) and automatically searching and/or filtering crowdsourced, donated, and/or publicly available data, photographs, video, commentary, and feeds and confirming the hazard event, the severity of the hazard event and/or damage 86. For example, in method 80, the initiation of determining of a property status may be triggered automatically by one or more triggering events. Triggering events may include a hazard event satisfying a predetermined criterion.

Notably, without requiring at least assigning field representatives, scheduling an in-person inspection, traveling to the property, performing an inspection, and providing a handwritten estimate, method 80 may include providing a settlement 90 based upon an autonomous insurance estimate, such as a roof estimate 88 (e.g., based upon a property status, as generated by EA system 100, as described in further detail elsewhere herein).

Thus, method 80 may result in lower costs and decreased processing times compared to conventional damage assessment process. Claim processing of method 80 may be less than three days, within twenty-four hours, within two hours, or immediately after and/or during the hazard event. Further, method 80 may configured to be associated with parametric insurance and/or be enabled to notify policyholders with minimal delay and may be triggered by a hazard event, e.g., and not triggered, or delayed, by a person. The policyholder may be notified and/or prompted, e.g., by text messages, to initiate claim processing events, review determined damage, and/or accept issuance of settlement funds, (e.g., by a policyholder selecting a yes or a no response).

Accordingly, in at least some embodiments described herein, a claim may be processed and/or damages may be determined without in-person inspections, inspection scheduling, and/or insurance adjustors. In at least some embodiments described herein, a claim may be processed and/or a damage may be determined without delay (such as in automated manner, such as with parametric insurance) and with increased consistency, fewer workplace injuries, fewer inspections per day, lower operating costs, shorter deployments for insurance adjusters, better work/life balance for employees, and increased employee satisfaction.

FIG. 2 depicts an exemplary data flow diagram of an event assessment process. The event assessment process may include additional, fewer, or alternative steps, including those described elsewhere herein. System 100 may include an EA computing device 102, an insurance computing device 104, a user computing device 106, and a historic database 108. In other embodiments, system 100 may include additional, fewer, or alternative devices, including those described elsewhere herein. For example, in some embodiments, EA computing device 102 may include insurance computing device 104.

EA computing device 102 may be communicatively coupled to insurance computing device 104, user computing device 106, and/or historic database 108. EA computing device 102 may be configured to perform an event assessment process for one or more vehicles and/or structures 114, as described herein. Vehicles and/or structures 114 may include any type of vehicle, such as an automobile, motorcycle, or truck, and/or any type of structure, such as a residential building, a commercial building, and/or an industrial building. Additionally, or alternatively, computing device 104 may be associated with an emergency services organization, public works department, and/or first responder.

EA computing device 102 may be communicatively coupled to a climate source 118 and/or a hazard event source 120 (e.g., a weather source). EA computing device 102 may receive and/or retrieve climate data 204 from climate source 118. The EA computing device 102 may retrieve and/or receive hazard event data 208 (e.g., weather incident data) from hazard event source 120 (e.g., a weather source).

In some embodiments, EA computing device 102 may be configured to retrieve hazard event data 208 from a plurality of hazard event sources. In some embodiments, the hazard event sources comprise one or more weather sources, e.g., AccuWeather (AW) weather service international and/or the National Weather Service. EA computing device 102 may store weather incident data 208 within historic database 108. In other embodiments, historic data 202 and/or historic event records 110 may be received from a different computing device (not shown).

In some embodiments, EA computing device 102 may finetune and/or revise event data for one or more locations. For example, in some embodiments, EA computing device 102 may receive hazard event data for a geographic location. EA computing device 102 may retrieve supplemental hazard event data (e.g., text data, image data, video data, audio data, etc. from crowdsourced data feeds, donated data, public data, social media data, and other data feeds) for the geographic location. Additional data may then be pulled based upon the supplemental hazard event data for the location. For example, if no hail was detected at the time predicted by a weather service, but the supplemental hazard event data indicates that a hail occurred 10 minutes later (e.g., a social media post with the caption "Wow, look at the size of this hail!" with a time stamp for 10 minutes after the predicted time), the EA system may pull additional supplemental hazard event data 10 minutes after the predicted time. The EA system may use this data to finetune and/or revise the hazard event data.

In some embodiments, EA computing device 102 may be configured to retrieve climate data 204 from a plurality of climate sources 118 and then EA computing device 102 may store climate data 204 within historic database 108. For example, and without limitation, EA computing device 102 may retrieve climate data 204 from the International Energy Conservation Code (IECC) and/or the Department of Energy's Building America (BA) Program. In other embodiments, historic event data 202 and/or historic event records 110 may be received from a different computing device (not shown).

Insurance computing device 104 may be associated with an insurance provider and/or another party responsible for insurance policy underwriting. Insurance computing device 104 may be associated with an insurance provider associated with an insurance policy for property 114. In certain embodiments, system 100 may include a plurality of insurance computing devices 104 that are communicatively coupled to EA computing device 102 and are associated with a plurality of insurance providers. Insurance computing device 104 may be in communication with EA computing device 104 to transmit and/or receive data associated with insurance claims. Additionally, or alternatively, the computing device 104 may be associated with an emergency services organization, public works department, and/or first responder.

User computing device 106 may be associated with a user or a group of users. User computing device 106 may be associated with an insurance policyholder 116. Policyholder 116 may be identified as an insured by the insurance policy for vehicle and/or structure 114. In other embodiments, user computing device 106 may be associated with a different user, such as, but not limited to, a building owner and/or an occupant (e.g., a renter or a leasee).

User computing device 106 may be in communication with EA computing device 102 to provide policyholder 116 with information from EA computing device 102. In some embodiments, user computing device 106 may be in communication with insurance computing device 104 to facilitate enrollment in an insurance policy and/or filing an insurance claim.

EA computing device 102 may be configured to retrieve historic data 202 to store within the historic database 108. In some embodiments, EA computing device 102 may compile retrieved historic data 202 to build a historic event record 110 and then EA computing device 102 may subsequently store historic event record 110 within historic database 108 for later use. Historic data 202 may include historic weather incident data 208, historic property status data, and/or historic insurance claim data 206.

Historic data 202 may comprise photographs, video, commentary, feeds, and/or other data associated with a hazard event and/or damage resulting from the hazard event. In some embodiments, historic data 202 comprises photographs taken before and after a hazard event. Additionally, or alternatively, historic data 202 comprises photographs taken during a hazard event.

EA computing device 102 may retrieve a plurality of historic event records 110 from historic database 108 to build a training dataset. The training data set may be used to train an EA model 210. EA model 210 may be generated and/or trained using the training dataset using any suitable analysis and/or statistical technique. In some embodiments, EA model 210 is trained using Computer Vision, analyzing and understanding digital images. In some embodiments, EA model 210 may include a plurality of model parameters for comparing individual parameters to determined parameters, as described herein. In other embodiments, EA model 210 may be in a different format, such as a function or a set of functions.

In some embodiments, EA computing device 102 may retrieve a subset of historic event records 110 from historic database 108. The subset may include a plurality of historic event records 110 having the same or similar hazard event and/or the same or similar vehicle or structure. The subsets of historic event records 110 may be used to build training datasets for a particular hazard event and/or vehicle or structure.

In some embodiments, EA computing device 102 may generate a plurality of individual EA models 210 each associated with a specific hazard event, referred to as hazard event models. Each individual model may be trained, separately, using the subset of historic event records 110 all having the same hazard event, e.g., weather events with the same weather signature. Alternatively, EA computing device 102 may generate a single EA model 210, referred to as a global model, that may be used to confirm a hazard event and/or assess damage associated with the hazard event.

As each hazard event model may be trained using only a subset of the historic event records 110, each having the same historic hazard event, the hazard event model may be trained using a smaller, more focused, training dataset, as compared to a training dataset including all of the historic event records 110, such that the hazard event model may be trained with a reduced computational load. Further, hazard event models trained using a subset of historic event records 110 may result in hazard event models that are more accurate for evaluating a particular hazard event. In addition, having a reduced and more focused training dataset that decreases computational load will have improved model training time allowing the hazard models to be more quickly updated as new historic event records 110 are created and added to the subset training dataset.

EA computing device 102 may be communicatively coupled to user computing device 106. User computing device may be associated with policyholder 116. Policyholder 116 may be associated with, e.g., the owner of, property 114. EA computing device 102 may receive supplemental event data 212 for a hazard event from a supplemental event data source 220. Supplemental event data 212 includes crowdsourced, donated, and/or public text data, image data, video data, and/or audio data associated with the weather event. In other embodiments, supplemental event data 212 may include any data associated with the hazard event and/or property 114 that enables system 100 to function as described herein.

EA computing device 102 may receive text data, image data, video data, and/or audio data associated with a subject vehicle or structure and applying the text data, image data, video data, and/or audio data to the trained, and/or tuned, event assessment model. The text data, image data, video data, and/or audio data may be obtained from crowdsourced, donated, and/or public data, as described above. EA computing device 102 may receive the different types of data (e.g., text data, image state, video data, audio data, etc.) and may be configured to translate, analyze, parse, and/or reformat the data into a standardized format. The data in the standardized format may be saved in a memory of EA computing device 102 so that it may be used for further analysis. For example, EA computing device 102 may receive image data and/or video data that may be analyzed using Computer Vision. The image data and/or video data may be translated, analyzed, parsed, and/or reformatted into text data.

EA computing device 102 may apply supplemental event data 212 to trained model 210 in order to determine one or more model outputs. The model outputs may include one or more of a determination of the presence and/or severity of a hazard event and/or a status of subject property 114 as a result of the hazard event. Property status 214 may include a cost, a description, a designation, a confidence score, and/or a severity level. For example, property statuses 214 may include a description indicating whether a portion of a structure requires repair and/or replacement, at least partially caused by the hazard event. Additionally, or alternatively, the property status may include a failure status indicating that the entire structure needs to be replaced. In some cases, property status 214 may include a non-damage status indicating that the property does not require repair and/or replacement as a result of the hazard event.

Property status 214 may include a severity level, e.g., severe damage or minimal damage. The severity level of the damage status may be associated with a cost to repair or replace from damage at least partially caused by the hazard event. For example, severe damage may be associated with a higher cost to repair or replace severe damage as compared to a cost to repair or replace minimal damage. The severity level may also include a repair time associated with a time to repair and/or replace the property. The severity level may include a range, e.g., high, medium, and low severity level, etc., where each of the levels includes a range of costs and/or repair times.

At least one of EA computing device 102 and/or model 210 may determine one or more recommendations 216 based upon, at least in part, determined property status 214. For example, in some embodiments, the model output may include recommendation 216. Recommendation 216 may include one or more recommended courses of actions related to the determined property status 214 (e.g., totally replace, partially replace, etc.). Recommendation 216 may include a recommendation to perform an in-person inspection or a recommendation not to perform an in-person inspection. EA computing device 102 may transmit model outputs, including one or more determined property statuses 214 and/or recommendation 216 to user computing device 106 and/or insurance computing device 104.

In the illustrated embodiment, EA system 100 may update the training dataset by creating one or more new historic event records 110. In particular, EA computing device 102 may generate new historic event records 110 in response to an actual property status, and then EA computing device 102 may add the newly generated historic event records 110 to the training dataset to generate an updated training dataset. Subsequently, EA computing device 102 may re-train model 210 using the updated training dataset, further improving the accuracy of model 210. In some embodiments, EA computing device 102 may transmit and/or receive one or more messages from insurance computing device 104 and/or user computing device 106, the messages indicating an actual property status. In some embodiments, insurance computing device 104 may determine one or more insurance quotes based upon property status 214 and/or recommendation data 216. Insurance computing device 104 may transmit insurance quotes to user computing device 106 and/or to EA computing device 102.

Exemplary User Computing Device

Figure 3:
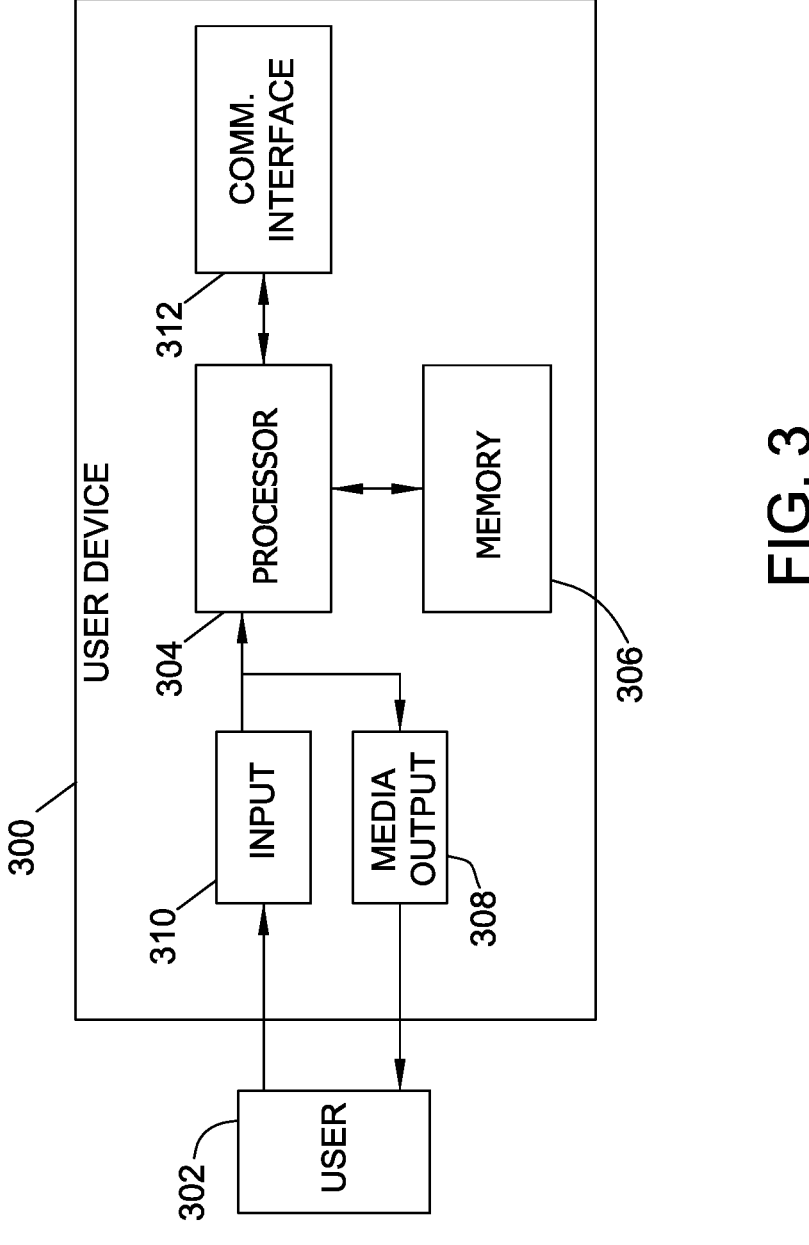
FIG. 3 illustrates an exemplary configuration of a user computer device, in accordance with one embodiment of the present disclosure.

FIG. 3 depicts an exemplary configuration of a user computing device 300, in accordance with one embodiment of the present disclosure. User computing device 300 may be operated by a user 302, such as policyholder 116. User computing device 300 may include, but is not limited to, EA computing device 102, insurance computing device 104, and/or user computing device 106 (all shown in FIG. 2). Additionally or alternatively, user computing device 300 may be, for example, a mobile device, smart home controller, smart vehicle, smart watch, smart contact lenses, augmented reality glasses, virtual reality headset, mixed or extended reality headset or glasses, wearables, voice or chat bot, ChatGPT bot or computing device, UAV (unmanned aerial device) or drone, other input device, and/or other electronic or electrical devices.

User computing device 300 may include a processor 304 for executing instructions. In some embodiments, executable instructions may be stored in a memory 306. Processor 304 may include one or more processing units (e.g., in a multi-core configuration). Memory 306 may be any device allowing information such as executable instructions and/or transaction data to be stored and retrieved. Memory 306 may include one or more computer readable media.

User computing device 300 may also include at least one media output component 308 for presenting information to user 302. Media output component 308 may be any component capable of conveying information to user 302. In some embodiments, media output component 308 may include an output adapter (not shown) such as a video adapter and/or an audio adapter. An output adapter may be operatively coupled to processor 304 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 308 may be configured to present a graphical user interface (e.g., a web browser and/or a client application) to user 302. A graphical user interface may include, for example, an interface for viewing prompts and data. In some embodiments, user computing device 300 may include an input 310 for receiving input from user 302. User 302 may use input 310 to, without limitation, provide user input 310.

Input device 310 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 308 and input device 310.

User computing device 300 may also include a communication interface 312, communicatively coupled to a remote device such as EA computing device 102 (shown in FIG. 2). Communication interface 312 may include, for example, a wired or wireless network adapter and/or a wireless data transceiver for use with a mobile telecommunications network.

Stored in memory 306 are, for example, computer readable instructions for providing a user interface to user 302 via media output component 380 and, optionally, receiving and processing input from input 310. A user interface may include, among other possibilities, a web browser and/or a client application. Web browsers enable users, such as user 302, to display and interact with media and other information typically embedded on a web page or a website from EA computing device 102 and/or insurance computing device 104. A client application may allow user 302 to interact with, for example, EA computing device 102. For example, instructions may be stored by a cloud service, and the output of the execution of the instructions may be sent to the media output component 408.

Exemplary Host Computing Device

Figure 4:
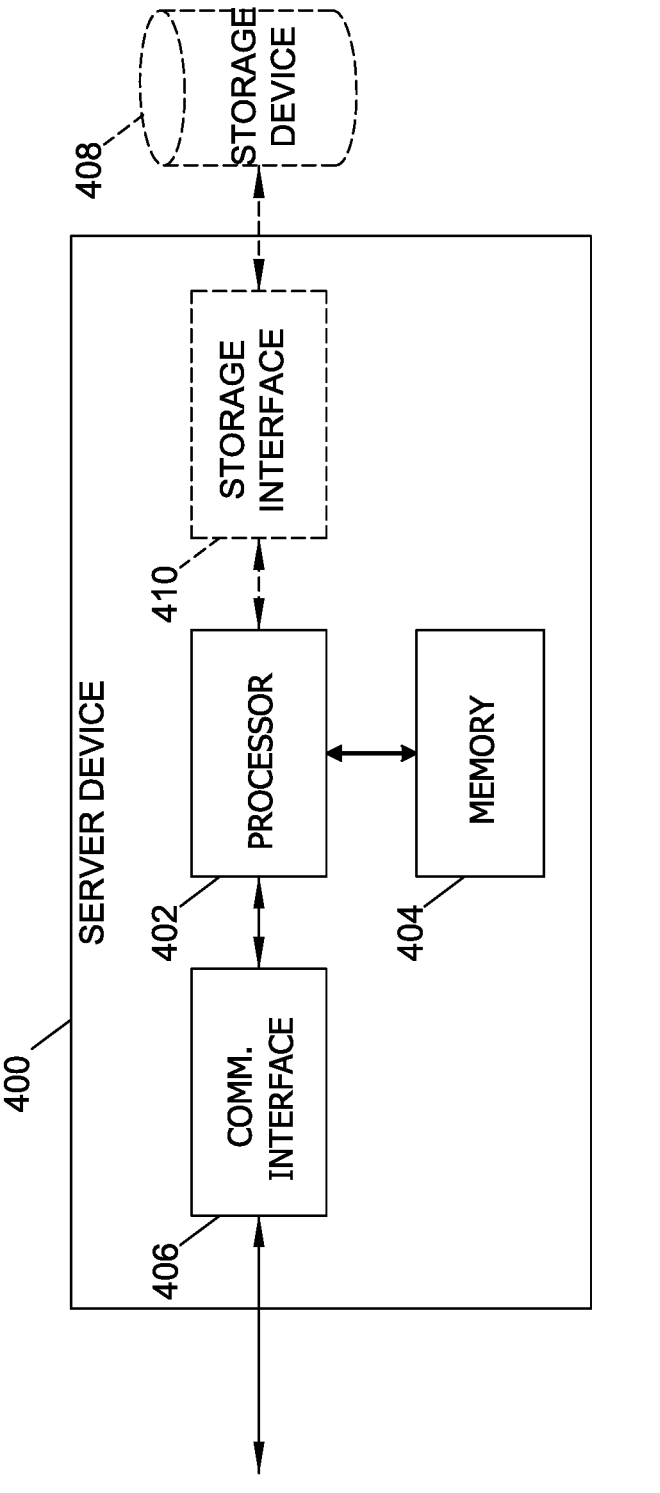
FIG. 4 illustrates an exemplary configuration of a host computing device, in accordance with one embodiment of the present disclosure.

FIG. 4 depicts an exemplary configuration of a host computing system, in accordance with one embodiment of the present disclosure. Host computing device 400 may include, but is not limited to, EA computing device 102, insurance computing device 104 (both shown in FIG. 2), and/or the other electrical or electronic devices mentioned elsewhere herein, and may be configured to employ the parametric insurance functionality discussed herein, such as issuing insurance payments after processor analysis or machine learning analysis of the sensor and other data. Host computing device 400 may also include a processor 402 for executing instructions. Instructions may be stored in a memory area 404. Processor 402 may include one or more processing units (e.g., in a multi-core configuration).

Processor 402 may be operatively coupled to a communication interface 406 such that host computing device 400 is capable of communicating with a remote device, such as another host computing device 400 and/or user computing device 300, for example, using wireless communication or data transmission over one or more radio links or digital communication channels. For example, communication interface 406 may receive data, e.g., climate data 204, event records 110, etc.

Processor 402 may also be operatively coupled to a storage device 408. Storage device 408 may be any computer-operated hardware suitable for storing and/or retrieving data, such as, but not limited to, data associated with historic databases 108 and/or climate source 118 (shown in FIG. 2). In some embodiments, storage device 408 may be integrated in host computing device 400. For example, host computing device 400 may include one or more hard disk drives as storage device 408.

In other embodiments, storage device 408 may be external to host computing device 400 and may be accessed by a plurality of host computing devices 400. For example, storage device 408 may include a storage area network (SAN), a network attached storage (NAS) system, and/or multiple storage units such as hard disks and/or solid-state disks in a redundant array of inexpensive disks (RAID) configuration.

In some embodiments, processor 402 may be operatively coupled to storage device 408 via a storage interface 410. Storage interface 410 may be any component capable of providing processor 402 with access to storage device 408. Storage interface 410 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 402 with access to storage device 408.

Figure 5:
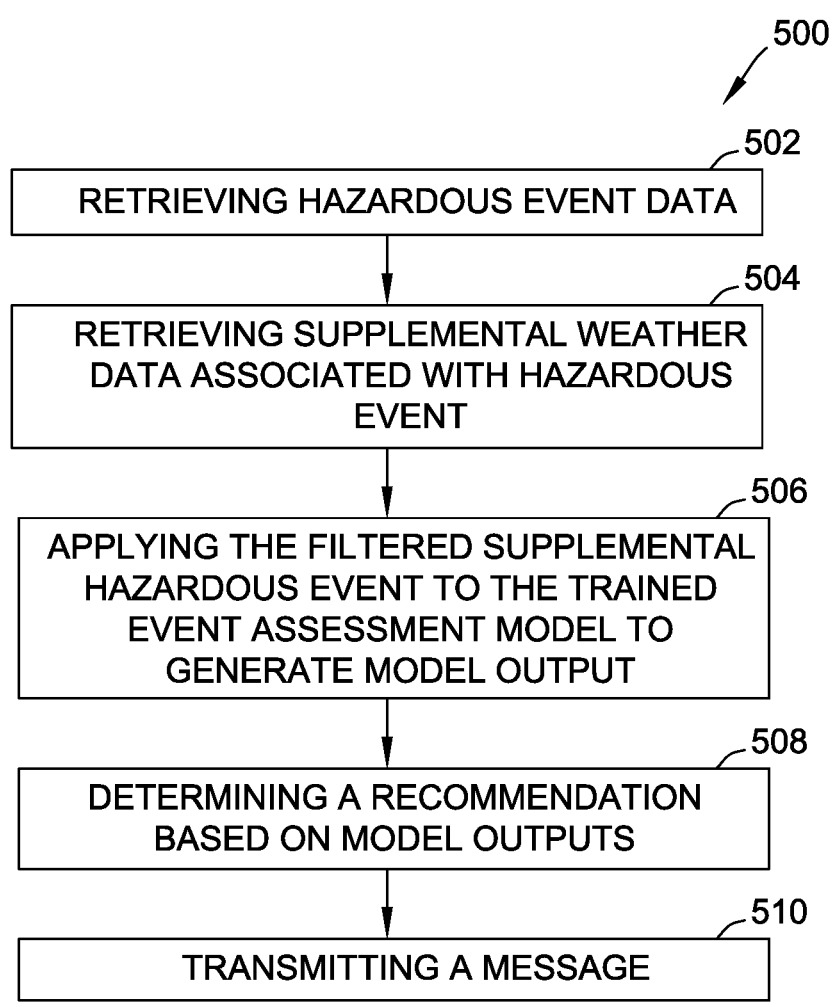
FIG. 5 illustrates a flow diagram of an exemplary computer-implemented method for determining/predicting a hazard event and/or damage resulting from the hazard event that may be implemented by the EA system described herein.

Processor 402 may execute computer-executable instructions for implementing aspects of the disclosure. In some embodiments, the processor 402 may be transformed into a special purpose microprocessor by executing computer-executable instructions or by otherwise being programmed. Exemplary Computer-Implemented Method for Assessing a Weather Event FIG. 5 depicts an exemplary computer-implemented method 500 for assessing a hazard event and/or resulting damage based upon a hazard event that may be used with EA system 100 (shown in FIG. 2). Method 500 may be at least partially performed by EA computing device 102 (shown in FIG. 2). In certain embodiments, method 500 may be at least partially performed by another computing device, such as insurance computing device 104 (shown in FIG. 2). In other embodiments, method 500 may include additional, fewer, or alternative steps, including those described elsewhere herein. For instance, method 500 may include one or more of the parametric insurance-related actions or functionality discussed herein.

With respect to FIG. 5, method 500 may include EA computing device 102 receiving 502, alternatively and/or additionally requesting or retrieving, hazard event data 208.

In some cases, one or more triggering events (or parametric insurance-related triggers or triggering events) may initiate, e.g., automatically cause, EA computing device 102 to receive 502 supplemental hazard event data 212 for a particular location.

A parametric trigger or triggering event may include hazard event data 208 satisfying a predetermined criterion. For example, if the hazard event is a hailstorm, the predetermined criterion may comprise one or more weather criterions, such as hail size (e.g., hail weight or volume) exceeding a predetermined threshold hail size. In another example, a predetermined criterion may include the hazard event having a hazard event signature that matches a predetermined hazard event signature.

A parametric trigger or triggering event may also include submission of a claim, e.g., by a policyholder. The submitted claim may include the location (e.g., GPS coordinates, climate locality, etc.) of the insured property identified in the claim that is affected by the hazard event. EA computing device 102 may use the location of the insured property, or other location (e.g., inputted by a user) to receiving 502 hazard event data 208 for the location.

In yet another additional, and/or alternative, example a parametric trigger or triggering event may include submission of one or more supplemental claims by one or more supplemental policyholders having insured properties located in proximity, e.g., within five miles, or within ten miles, to the policyholder. In some cases, a hazard event may affect a plurality of policyholders in a region in which the hazard event occurred. In some cases, one or more policyholders having insured properties in proximity to each other may submit claims. Accordingly, the submission of one or more claims in a geographic region affected by the weather incident may be a triggering event (or parametric trigger) to retrieve hazard event data 208 for a geographic location of a policyholder(s), within or near the geographic region, who have not yet submitted a claim. Receiving 502 hazard event data 208 may be triggered by additional, and/or alternative, triggering events that automatically cause EA computing device 102 to retrieve hazard event data 208.

Method 500 may include retrieving 504, alternatively and/or additionally requesting or receiving, supplemental hazard event data associated with the hazard event 212. Supplemental hazard event data 212 may comprise crowd-sourced, donated, and/or public text data, image data, video data, and/or audio data). In some embodiments, crowd-sourced, donated, and/or public text data, image data, video data, and/or audio data is searched and/or filtered based upon a target location and timing associated with the hazard event.

In some embodiments, one or more triggering events may initiate, e.g., automatically cause, EA computing device 102 to retrieve 502 supplemental hazard event data 212. A triggering event may include one or more of the following: EA computing device 102 receiving 502 hazard event data 208, a hazard event satisfying a predetermined criterion (e.g., if the hazard event is a weather event, satisfying a parametric weather trigger or weather triggering event), and/or a claim submission. Additional, and/or alternative, triggering events may automatically cause the EA computing device 102 to retrieve 504 supplemental hazard event data.

Method 500 may include EA computing device 102 applying 506 one or more model inputs to a trained EA model 210 to generate one or more EA model outputs. Model inputs include the supplemental hazard event data 212. Model inputs may optionally include hazard event data 208. The outputs may include a determination of the presence and/or severity of the hazard event at a particular location and/or property status 214 associated with property damage of the subject property resulting from the hazard event. The outputs may include a description of the property status 214 and/or a determined cost associated with the repair and/or replacement of the property damage, e.g., material costs and labor costs. The outputs may include a length of time to repair or replace the property damage, e.g., days, weeks and/or months. The outputs may also include indirect costs, for example, hotel costs for the policyholder to stay while the damage is repaired. In some cases, EA model 210 may output a confidence score associated with an accuracy of the determined property status and/or the determined cost. EA model 210 may also generate one or more other suitable outputs.

Method 500 may include determining 508 one or more recommendations based upon, at least in part, EA model 210 outputs. For example, EA computing device 102 may determine 508 one or more recommendations based upon, at least in part, the determined property status, the determined damage description, the determined costs, and/or the confidence score. For example, determining 508 a recommendation may include determining if a model output meets a recommendation criterion.

In a first example, determining 508 one or more recommendations may include EA computing device 102 determining if the determined cost satisfies the cost criterion (satisfying the cost criterion may act as another parametric trigger or triggering event that leads to additional functionality automatically being employed) and the EA computing device 102 may generate an inspection recommendation based upon the determination. A cost criterion (or parametric trigger) may include the determined cost exceeding a cost threshold. The cost threshold may include costs in excess of $50,000, in excess of $100,000.00, and/or in excess of $200,000, for example.

If EA computing device 102 determines that the determined cost exceeds the cost threshold, then EA computing device 102 may automatically determine a recommendation including recommending an in-person inspection. Likewise, if the EA computing device 102 determines that the determined cost does not exceed the cost threshold, then the EA computing device 102 may determine a recommendation including recommending that an in-person inspection is not necessary.

In another example, determining 508 one or more recommendations may include EA computing device 102 determining if the confidence score satisfies a score criterion (satisfying the score criterion may act as another parametric trigger or triggering event that leads to additional functionality automatically being employed). A score criterion may by a score threshold, such as 60%, 50%, and/or 40%, for example.

If EA computing device 102 determines that the confidence score does not exceed the score threshold, then EA computing device 102 may determine a recommendation including recommending an in-person inspection. Likewise, if EA computing device 102 determines that the confidence score exceeds the score threshold, then EA computing device 102 may determine a recommendation including recommending that an in-person inspection is not necessary.

In yet another example, EA computing device 102 may determine a repair recommendation regarding the repair and/or replacement of the damaged property, e.g., a recommended type and/or material that should be used for the repair and/or replacement of the damaged property. The repair recommendation may be automatically determined, for instance, if a cost or score criteria have been satisfied if they are being employed as parametric triggers or triggering events.

In yet another example, determining 508 one or more recommendations may include EA computing device 102 determining if the determined hazard event and/or property status warrants notification to an emergency services organization, a public works department, and/or a first responder.

Method 500 may include EA computing device 102 transmitting 510 one or more status messages. The one or more status messages may be transmitted to at least one of policyholder 116, e.g., to a user computing device 106, and/or an insurance provider associated with an insurance policy for property 114, e.g., to an insurance computing device 104. Additionally, or alternatively, the one or more status messages may be transmitted to an emergency services organization, a public works department, and/or a first responder. The status messages may include the one or more model outputs, such as the determined property status 214 and/or recommendation 216.

Method 500 may also include one or more actions for generating, e.g., training and/or tuning, EA model 210. Method 500 may include retrieving historic event records 110 from historic database 108. Method 500 may include EA computing device 102 retrieving historic event data 202 from at least one of insurance computing device 104 and/or climate source 118. In some embodiments, method 500 may include EA computing device 102 generating historic event records 110 by compiling retrieved historic event data 202. In some embodiments, method 500 may include EA computing device 102 storing the generated historic event records 110 within historic database 108.

Method 500 may include EA computing device 102 building a training dataset. The training dataset may include retrieving historic event records 110 from the historic database 108 and/or retrieving a subset of the historic event records 110 from the historic database 108. In some embodiments, method 500 may include EA computing device 102 building a climate specific training dataset and/or a hazard event signature specific training dataset, including EA computing device 102 retrieving a plurality of historic event records 110, each having the same climate locality and/or the same hazard event signature, respectively.

Method 500 may include EA computing device 102 training EA model 210 based using the training dataset. In certain embodiments, EA model 210 may include a plurality of model parameters. Method 500 may further include EA computing device 102 tuning the trained EA model 210 by iteratively evaluating the EA model 210 while adjusting weighting factors of the model parameters until the error in the model outputs meets an error criterion.

EA computing device 102 may store EA model 210 for subsequent access during an event assessment process.

Method 500 may include EA computing device 102 generating one or more new historic event records 110, in response to EA computing device 102 determining the actual status of property. In some embodiments, method 500 may include EA computing device 102 comparing an actual property status, e.g., the actual cost, to the determined property status, e.g., EA model 210 determined cost. If EA computing device 102 determines that the comparison satisfies a criterion (satisfying the criterion may act as another parametric trigger or triggering event that again leads to additional functionality automatically being employed), EA computing device 102 may generate a new historic event record 110 including the EA model 210 determined cost.

Method 500 may further include adding new historic event records to the training dataset to generate an updated training dataset. Method 500 may further include EA computing device 102 using the updated training dataset to re-train EA model 210 in order to generate a more accurate and/or a more up to date version of EA model 210.

Exemplary Computing Device

Figure 6:
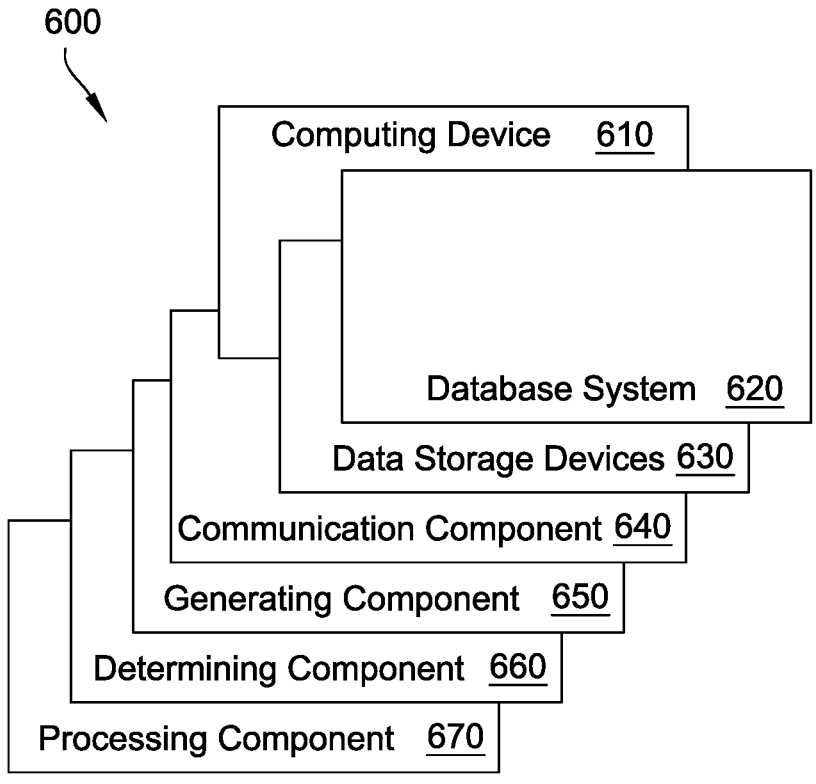
FIG. 6 illustrates a diagram of components of one or more exemplary computing devices that may be used in the EA system described herein.

FIG. 6 depicts a diagram 600 of components of one or more exemplary computing devices 610 that may be used in system 100, shown in FIG. 2. In some embodiments, computing device 610 may be similar to EA computing device 102 (shown in FIG. 2) and/or the other computing devices discussed elsewhere herein. Database system 620 may be coupled with several separate components within computing device 610, which perform specific tasks. Database system 620 may include a plurality of distributed databases that store specific types of data, such as historic database 108, and/or climate database 118 (shown in FIG. 2). In this embodiment, database 620 system may include historic event data 202, climate data 204, and/or historic event records 110.

Computing device 610 may include database system 620, as well as data storage devices 630. Computing device 610 may also include a communication component 640 for receiving and/or retrieving event data and/or historic event records 110. Computing device 610 may further include a generating component 650 for generating, e.g., training EA model 210 for the retrieved data (shown in FIG. 2). Computing device 610 further includes a determining component 660 for determining the presence and/or severity a hazard event and/or damage resulting from such hazard event. A processing component 670 may assist with execution of computer-executable instructions associated with the system.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), voice or chat bots, ChatGPT bots, augmented reality glasses, virtual reality headsets, mixed or extended reality headsets or glasses, mobile devices, smart watches, wearables, smart contact lenses, other computing input devices, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and may be followed with reinforcement or reinforced learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data (e.g., training based upon updated datasets indicating, for example, whether properties predictively identified by EA system 100 as including roofs that would be replaced if a certain size hail stone impacted them actually required replacement in the next hailstorm including hail stones of that certain size). Models may be created based upon example inputs in order to make valid and reliable predictions for novel inputs.

Additionally, or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

In some embodiments, at least part of EA system 100 may be implemented in a cloud computing service and/or utilize certain tools or other evolving technologies (e.g., blockchain, artificial intelligence (AI), Computer Vision, Quick-Sight, SageMaker, Athena).

EXEMPLARY PARAMETRIC EMBODIMENTS

The present embodiments may relate to parametric insurance, such as parametric homeowners insurance, or the like. For instance, based upon processor analysis of supplemental event data, if a parametric trigger event or triggering threshold has been satisfied (such as a processor determination that a hailstorm of sufficient size hail that lasted for a sufficient duration likely hit a neighborhood or individual home, and/or other thresholds have been met (such as a cost, score, and/or other threshold, including those discussed herein), an automatic payout to an insured will be issued or otherwise sent, and/or other actions may be initiated or taken.

In one aspect, an EA computing device may include at least one memory and at least one processor in communication with the at least one memory may be provided. The at least one processor may be programmed to receive (e.g., via one or more application programming interfaces (APIs)) hazard event data (e.g., if the hazard event is a hailstorm, the hazard event data may comprise hail size, duration of weather incident, weather incident severity, weather signature, wind speed, wind direction, and/or temperature) associated with a hazard event in a geographic location and in response, automatically retrieve supplemental event data (e.g., crowdsourced, donated, and/or public data, photographs, video, commentary and feeds) for a target geographic location. The target geographic location may be associated with an insured vehicle and/or structure stored in the at least one memory.

The at least one processor may also be programmed to apply the supplemental event data to a trained event assessment model configured to determine, in real-time, the presence and/or severity of a hazard event and/or damage associated with the weather event. The trained event assessment model may be trained using historic event data. The at least one processor may be further programmed to receive an output from the trained event assessment model. The output may include a determination of the presence and/or severity of a hazard event and/or damage associated with the hazard event. Based upon the determination, the at least one processor may transmit a message to a user computing device associated with an insurance policy that causes display of a claim selector at the user computing device. Selection of the claim selector may cause initiation of an insurance claim. Additionally, or alternatively, the at least one processor may transmit a message to a computing device associated with an emergency services organization, public works department, and/or first responder.

In some aspects, the EA computing device may be programmed to train the event assessment model using historic records (including the historic supplemental event data), update the historic records to updated historic records including a new historic record (the new historic record including the supplemental event data and the determination of the presence and/or severity of a hazard event and/or damage resulting from the hazard event), and re-train the trained event assessment model using the updated historic records.

In some aspects, the EA computing device may be programmed to receive an input from the user computing device associated with selection of the claim selector and transmit a claim message to the user computing device that causes display of one or more data fields for entry of data associated with the claim.

In some aspects, the supplemental event data may be retrieved in response to a triggering event (or parametric trigger or event) wherein the triggering event includes at least one of: (i) a policyholder submitting a policy claim, (ii) hazard event data satisfying a predetermined criterion, and (iii) a supplemental policyholder submitting a policy claim wherein the supplemental policyholder is associated with a property having a location near the user's property location.

In some aspects, the at least one processor may be further configured to, in response to selection of the claim selector, initiate and complete (e.g., provide payment to policyholder and/or close) the claim without requiring an in-person inspection of the property.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied, or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In one embodiment, a computer program is provided, and the program is embodied on a computer readable medium. In an exemplary embodiment, the system may be executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An event assessment (EA) computing device for analyzing hazard events, the EA computing device comprising at least one memory and at least one processor in communication with the at least one memory, wherein the at least one processor is programmed to:

receive hazard event data associated with a hazard event of a hazard type in a geographic radius from a first hazard event source, the first hazard event source comprising a weather service;

automatically search one or more supplemental hazard event sources for supplemental hazard event data for a specific location within the geographic radius based upon receiving the hazard event data, wherein the supplemental hazard event data is associated with the hazard event, the one or more supplemental hazard event sources comprising a public data source;

apply the supplemental hazard event data to a trained event assessment model to determine at least one of a status of the hazard event or a status of a property, wherein the trained event assessment model is selected from a plurality of trained event assessment models trained for different hazard types based upon the trained event assessment model being trained for the hazard type of the hazard event by being trained:

in a first stage using first historical hazard event data from the first hazard event source, the first historical hazard event data identifying historical weather events having the hazard type; and in a second stage using second historical hazard event data from the one or more supplemental hazard event sources, the second historical hazard event data comprising at least one of picture data or video data associated with the historical weather events having the hazard type;

receive an output from the trained event assessment model, wherein the output comprises a recommendation associated with the hazard event; and transmit a message to a user computing device, the message including the recommendation.

2. The EA computing device of claim 1, wherein the supplemental hazard event data is at least one of crowd-sourced, donated, or public data.

3. The EA computing device of claim 1, wherein the supplemental hazard event data is associated with a timing of the hazard event and the specific location.

4. The EA computing device of claim 1, wherein the at least one processor is further programmed to receive the hazard event data via one or more application programming interfaces (APIs).

5. The EA computing device of claim 1, wherein the at least one processor is further programmed to train the event assessment model using historical records comprising historical supplemental hazard event data and historical damage data.

6. The EA computing device of claim 5, wherein the at least one processor is further programmed to:

update the historical records to updated historical records comprising a new historical historic record, the new historical record comprising the historical supplemental hazard event data and the historical damage data; and re-train the trained event assessment model using the updated historical records.

7. The EA computing device of claim 1, wherein the property is associated with a policy, the user computing device is associated with the policy, and the message causes display of a claim selector at the user computing device, wherein selection of the claim selector causes initiation of a claim.

8. The EA computing device of claim 7, wherein the at least one processor is further configured to receive an input from the user computing device associated with selection of the claim selector.

9. The EA computing device of claim 8, wherein the at least one processor is further configured to, in response to selection of the claim selector, initiate the claim without requiring an in-person inspection of the property.

10. The EA computing device of claim 1, wherein the property is a first property and wherein the hazard event data is retrieved in response to a triggering event, wherein the triggering event includes at least one of: i) a policyholder submitting a policy claim, ii) the hazard event data satisfying a weather criterion, or iii) a supplemental policyholder submitting a policy claim associated with a second property within a predetermined distance of the first property.

11. The EA computing device of claim 1, wherein the at least one processor is further configured to:

receive the second historical hazard event data in a first format associated with the at least one of the picture data or the video data;

translate the second historical hazard event data into a second format comprising text data; and store the second historical hazard event data in the second format.

12. A computer-based method for analyzing hazard events, the computer-based method implemented by at least one processor in communication with at least one memory, the computer-based method comprising:

receiving hazard event data associated with a hazard event of a hazard type in a geographic radius from a first hazard event source, the first hazard event source comprising a weather service;

automatically searching one or more supplemental hazard event sources for supplemental hazard event data for a specific location within the geographic radius based upon receiving the hazard event data, wherein the supplemental hazard event data is associated with the hazard event, the one or more supplemental hazard event sources comprising a public data source;

applying the supplemental hazard event data to a trained event assessment model to determine at least one of a status of the hazard event or a status of a property, wherein the trained event assessment model is selected from a plurality of trained event assessment models trained for different hazard types based upon the trained event assessment model being trained for the hazard type of the hazard event by being trained:

in a first stage using first historical hazard event data from the first hazard event source, the first historical hazard event data identifying historical weather events having the hazard type; and in a second stage using second historical hazard event data from the one or more supplemental hazard event sources, the second historical hazard event data comprising at least one of picture data or video data associated with the historical weather events having the hazard type;

receiving an output from the trained event assessment model, wherein the output comprises a recommendation associated with the hazard event; and transmitting a message to a user computing device, the message including the recommendation.

13. The computer-based method of claim 12, wherein the supplemental hazard event data is at least one of crowdsourced, donated, or public data.

14. The computer-based method of claim 12, wherein the supplemental hazard event data is associated with a timing of the hazard event and the specific location.

15. The computer-based method of claim 12, wherein the hazard event data is received via one or more application programming interfaces (APIs).

16. The computer-based method of claim 12, further comprising training the trained event assessment model using historical records comprising historical supplemental hazard event data and historical damage data.

17. The computer-based method of claim 16, further comprising:

updating the historical records to updated historical records comprising a new historical record, the new historical record comprising the historical supplemental hazard event data and the historical damage data; and re-training the trained event assessment model using the updated historical records.

18. The computer-based method of claim 17, further comprising receiving an input from the user computing device associated with selection of the claim selector.

19. The computer-based method of claim 12, wherein the property is associated with a policy, the user computing device is associated with the policy, and the message causes display of a claim selector at the user computing device, wherein selection of the claim selector causes initiation of a claim.

20. At least one non-transitory computer-readable storage media having computer-executable instructions embodied thereon for analyzing hazard events, wherein when executed by at least one processor, the computer-executable instructions cause the at least one processor to:

receive hazard event data associated with a hazard event of a hazard type in a geographic radius from a first hazard event source, the first hazard event source comprising a weather service;

automatically search one or more supplemental hazard event sources for supplemental hazard event data for a specific location within the geographic radius based upon receiving the hazard event data, wherein the supplemental hazard event data is associated with the hazard event, the one or more supplemental hazard event sources comprising a public data source;

apply the supplemental hazard event data to a trained event assessment model to determine at least one of a status of the hazard event or a status of a property, wherein the trained event assessment model is selected from a plurality of trained event assessment models trained for different hazard types based upon the trained event assessment model being trained for the hazard type of the hazard event by being trained:

in a first stage using first historical hazard event data from the first hazard event source, the first historical hazard event data identifying historical weather events having the hazard type; and in a second stage using second historical hazard event data from the one or more supplemental hazard event sources, the second historical hazard event data comprising at least one of picture data or video data associated with the historical weather events having the hazard type;

receive an output from the trained event assessment model, wherein the output comprises a recommendation associated with the hazard event; and transmit a message to a user computing device, the message including the recommendation.

21. An event assessment (EA) computing device for analyzing hazard events, the EA computing device comprising at least one memory and at least one processor in communication with the at least one memory, wherein the at least one processor is programmed to:

retrieve one or more trigger parameters for an insurance contract;

receive hazard event data associated with a hazard event of a hazard type in a geographic radius from a first hazard event source, the first hazard event source comprising a weather service;

automatically search one or more supplemental hazard event sources for supplemental hazard event data for a specific location within the geographic radius based upon receiving the hazard event data, wherein the supplemental hazard event data is associated with the hazard event, the one or more supplemental hazard event sources comprising a public data source;

apply the supplemental hazard event data to a trained event assessment model to determine if the one or more trigger parameters are met, wherein the trained event assessment model is selected from a plurality of trained event assessment models trained for different hazard types based upon the trained event assessment model being trained for the hazard type of the hazard event by being trained:

in a first stage using first historical hazard event data from the first hazard event source, the first historical hazard event data identifying historical weather events having the hazard type; and in a second stage using second historical hazard event data from the one or more supplemental hazard event sources, the second historical hazard event data comprising at least one of picture data or video data associated with the historical weather events having the hazard type; and in response to the one or more trigger parameters being met, causing to be displayed on a user computing device, a claim associated with the insurance contract.

* * * * *